United States Patent
Azuma

(10) Patent No.: US 12,479,751 B2
(45) Date of Patent: Nov. 25, 2025

(54) METHOD FOR PRODUCING GLASS PLATE, AND LAMINATE

(71) Applicant: HOYA CORPORATION, Tokyo (JP)

(72) Inventor: Shuhei Azuma, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 484 days.

(21) Appl. No.: 17/915,440

(22) PCT Filed: Mar. 24, 2021

(86) PCT No.: PCT/JP2021/012410
§ 371 (c)(1),
(2) Date: Sep. 28, 2022

(87) PCT Pub. No.: WO2021/200512
PCT Pub. Date: Oct. 7, 2021

(65) Prior Publication Data
US 2023/0147153 A1    May 11, 2023

(30) Foreign Application Priority Data

Mar. 31, 2020   (JP) ................. 2020-062674

(51) Int. Cl.
*B32B 15/04* (2006.01)
*B32B 17/06* (2006.01)
(Continued)

(52) U.S. Cl.
CPC ............ *C03B 33/091* (2013.01); *C03B 32/00* (2013.01); *C03B 33/07* (2013.01)

(58) Field of Classification Search
CPC ................................................ C03B 33/0222
(Continued)

(56) References Cited

U.S. PATENT DOCUMENTS 8,747,688 B2 * 6/2014 Kawai ..................... C03C 15/02
                                                        438/689
10,611,667 B2 * 4/2020 Bookbinder ........ C03B 33/0222
(Continued)

FOREIGN PATENT DOCUMENTS

CN        111149161 A      5/2020
JP      2000141188 A  *   5/2000
(Continued)

OTHER PUBLICATIONS

JP-2000141188-A EPO Machine translation retrieved Jan. 22, 2025. (Year: 2025).*
(Continued)

*Primary Examiner* — Lauren R Colgan
(74) *Attorney, Agent, or Firm* — Global IP Counselors, LLP

(57) ABSTRACT

A method for producing an intermediate glass plate includes a defect formation step, a separation step, and a polishing step. In the defect formation step, a defect is formed on main surfaces of glass blanks by irradiating a laminate of the glass blanks with a laser beam from one side in a lamination direction in which the glass blanks are laminated, along the lamination direction, and moving the laser beam relative to the laminate such that a circle is drawn in a view from the main surfaces of the glass blanks. In the separation step, a cylindrical laminate is formed by separating a removal target portion along the defect while maintaining the laminate. In the polishing step, a side wall surface of the laminate is polished while maintaining the cylindrical laminate so as to obtain a disk-shaped intermediate glass plate that has been subjected to edge surface polishing.

14 Claims, 3 Drawing Sheets

(51) Int. Cl.
  *C03B 32/00*  (2006.01)
  *C03B 33/07*  (2006.01)
  *C03B 33/09*  (2006.01)
(58) Field of Classification Search
  USPC .................................................. 428/426, 428
  See application file for complete search history.

(56) References Cited

U.S. PATENT DOCUMENTS

| | | | |
|---|---|---|---|
| 11,524,366 B2* | 12/2022 | Groninger | C03B 33/04 |
| 11,884,582 B2* | 1/2024 | Azuma | B23K 26/3576 |
| 12,077,465 B2* | 9/2024 | Azuma | C03B 33/0222 |
| 2002/0108400 A1* | 8/2002 | Watanabe | G11B 5/73921 |
| | | | 428/64.2 |
| 2009/0233529 A1* | 9/2009 | Ueda | C03C 19/00 |
| | | | 451/60 |
| 2011/0171415 A1* | 7/2011 | Eda | C03C 23/009 |
| | | | 428/64.2 |
| 2012/0021677 A1 | 1/2012 | Ueda | |
| 2015/0165548 A1* | 6/2015 | Marjanovic | C03B 33/091 |
| | | | 219/121.73 |
| 2015/0166393 A1* | 6/2015 | Marjanovic | B23K 26/0622 |
| | | | 65/61 |
| 2015/0166394 A1* | 6/2015 | Marjanovic | B23K 26/0884 |
| | | | 428/192 |
| 2018/0057390 A1* | 3/2018 | Hackert | C03C 3/093 |
| 2021/0005220 A1* | 1/2021 | Takano | B32B 5/024 |
| 2021/0230042 A1* | 7/2021 | Azuma | C03C 3/085 |
| 2022/0274870 A1* | 9/2022 | Azuma | B23K 26/53 |

FOREIGN PATENT DOCUMENTS

| | | |
|---|---|---|
| JP | 2002-150546 A | 5/2002 |
| JP | 2008-105171 A | 5/2008 |
| JP | 2013-073636 A | 4/2013 |
| WO | 2008041493 A1 | 4/2008 |
| WO | 2019172456 A1 | 9/2019 |
| WO | 2021020587 A1 | 2/2021 |

OTHER PUBLICATIONS

International Search Report in PCT/JP2021/012410 dated May 25, 2021.

* cited by examiner

METHOD FOR PRODUCING GLASS PLATE, AND LAMINATE

CROSS-REFERENCE TO RELATED APPLICATIONS

This U.S. National stage application of International Patent Application No. PCT/JP2021/012410, filed on Mar. 24, 2021, which, in turn, claims priority to Japanese Patent Application No. 2020-062674, filed in Japan on Mar. 31, 2020. The entire contents of Japanese Patent Application No. 2020-062674 are hereby incorporated herein by reference.

BACKGROUND

Field of the Invention

The present invention relates to a method for producing a disk-shaped intermediate glass plate from a glass blank, a method for producing a glass plate for a magnetic disk from this intermediate glass plate, and an intermediate glass plate laminate.

Background Information

A magnetic disk obtained by providing a magnetic layer on a disk-shaped nonmagnetic glass plate for a magnetic disk is used in a hard disk drive for recording data.

When a glass plate for a magnetic disk is produced, edge surfaces (an inner edge surface and an outer edge surface) of a disk-shaped glass blank are polished. When edge surfaces of a glass blank are to be polished, in order to increase operation efficiency of polishing edge surfaces of the glass blank, a method is used in which a glass blank laminate obtained by laminating a plurality of glass blanks in the normal direction of main surfaces thereof is formed, and edge surfaces of multiple glass blanks are simultaneously polished using a polishing jig such as a polishing brush.

If outer circumferential edge surface polishing and inner circumferential edge surface polishing are performed, a glass substrate lamination jig is known with which outer circumferential edge surface polishing and inner circumferential edge surface polishing can be performed without disassembling the glass blank laminate, for example (JP 2013-73636A).

SUMMARY

In recent years, a technique for cutting out a circular glass blank whose shape is close to a perfectly circular shape, using a laser beam, has been proposed, and a circular glass blank whose outer shape is close to a perfectly circular shape can be produced using this technique.

In order to perform edge surface polishing, a plurality of such glass blanks are laminated on each other with a shaft passing through the inner holes provided around the center points of the glass blanks. However, even when the outer shape of the glass blank is close to a perfect circle and the degree of concentricity of the circular shapes between the inner circumference of the inner hole and the outer circumference of the outer shape is high, a small gap is required between the outer circumference of the shaft and the inner circumference (the circumference of the inner edge surface) of the inner hole in order to pass the shaft through the inner hole. However, if the shaft is passed through the inner holes in the glass blanks and a laminate is produced by laminating a plurality of glass blanks, due to the above gap, it is difficult to laminate the glass blanks that have a nearly perfectly circular shape while precisely aligning the outer edge surfaces of the glass blanks, and a slight level difference tends to occur on a cylindrical side wall surface. That is, it is difficult to significantly reduce the cylindricity of the outer shape of the side wall surface in the laminate. Thus, when the side wall surface of the laminate is to be polished, even when the laminate has a slight level difference, a machining allowance for polishing needs to be increased so as to eliminate the level difference on the side wall surface, which is not preferable in terms of production efficiency. Also, because polishing is performed so as to eliminate the level difference, there are cases where the roundness of the outer shape of the polished glass blank deteriorates and the roundness may vary between glass blanks.

In view of this, the present invention aims to provide a method for producing an intermediate glass plate by which, when producing disk-shaped intermediate glass plates from a glass blank, it is possible to efficiently produce the intermediate glass plates whose outer shapes have small roundness values and have little variation in the roundness between the intermediate glass plates, a magnetic-disk glass plate producing method for producing a glass plate for a magnetic disk from this intermediate glass plate, and an intermediate glass plate laminate.

One aspect of the present invention is a method for producing a disk-shaped intermediate glass plate from a glass blank, the method including:

a step of forming a defect on main surfaces of a plurality of laminated glass blanks by irradiating a laminate of the glass blanks obtained by laminating the glass blanks, with a laser beam from one side in a lamination direction in which the glass blanks are laminated, along the lamination direction, and moving the laser beam relative to the laminate such that a circle is drawn in a view from the main surfaces of the glass blanks;

a step of forming a cylindrical laminate by separating a removal target portion along the defect while maintaining the laminate; and a step of polishing a side wall surface of the laminate while maintaining the cylindrical laminate so as to obtain a disk-shaped intermediate glass plate that has been subjected to edge surface polishing.

It is preferable that the cylindrical laminate before the side wall surface is polished has a cylindricity of 7 µm or less.

It is preferable that the side wall surface of the cylindrical laminate before the side wall surface is polished has an arithmetic average roughness Ra of 0.5 µm or less.

It is preferable that, in the step of polishing the side wall surface, polishing is performed so as to form a chamfered surface on each edge surface of the intermediate glass plate.

It is preferable that the volume of the removal target portion is 35% or less of the total volume of the laminated glass blanks.

It is preferable that, when the removal target portion is separated from the laminate, the removal target portion is separated by advancing the defect by supplying an etchant to the laminate.

It is preferable that, when the removal target portion is separated from the laminate, the removal target portion is separated by advancing the defect by applying heat to the laminate.

It is preferable that the intermediate glass plate is provided with an inner hole so as to have a circular inner circumference, in the step of forming the defect, the defect is formed in two circles in order to form a circular shape of an outer circumference and a circular shape of the inner circumference, in the step of forming the cylindrical laminate, an outer portion of a larger circle of the two circles and an inner portion of a smaller circle of the two circles are removed from the laminate as the removal target portions, and in the step of polishing the side wall surface of the laminate, side wall surfaces of the laminate that respectively correspond to the outer circumference and the inner circumference are polished.

Another aspect of the present invention is a method for producing a glass plate for a magnetic disk, the method including:

a step of producing an intermediate glass plate using the method for producing an intermediate glass plate; and a step of producing a glass plate for a magnetic disk by polishing main surfaces of the intermediate glass plate that is separated from the laminate.

Another aspect of the present invention is a circular intermediate glass plate laminate, in which an outer shape of the laminate is a cylindrical shape, and an outer side wall surface of the cylindrical shape of the laminate has a cylindricity of 7 μm or less, and the side wall surface has an arithmetic average roughness Ra of 0.5 μm or less.

It is preferable that the side wall surface has a cylindricity of 3 μm or less, and the side wall surface has an arithmetic average roughness Ra of 0.02 μm or less.

It is preferable that the laminate is provided with an inner hole around a central axis of the cylindrical shape, the inner hole has a cylindricity of 7 μm or less, and a deviation between a central axis of the inner hole and the central axis of the cylindrical shape is 3 μm or less.

It is preferable that a chamfered surface is not provided on an inner edge surface of the intermediate glass plate that corresponds to an inner side wall surface of the laminate that extends along the inner hole, or even when a chamfered surface is provided, a chamfer width along the main surfaces of the intermediate glass plate is 150 μm or less.

According to the above-described method for producing an intermediate glass plate and method for producing a glass plate for a magnetic disk, when producing disk-shaped intermediate glass plates from a glass blank, it is possible to efficiently produce the intermediate glass plates whose outer shapes have small roundness values and have little variation in the roundness between intermediate glass plates.

DETAILED DESCRIPTION OF THE EMBODIMENTS

The following describes a method for producing an intermediate glass plate, a method for producing a glass plate for a magnetic disk, and an intermediate glass plate laminate according to embodiments of the present invention in detail.

(Method for Producing Intermediate Glass Plate)

A method for producing an intermediate glass plate according to this embodiment will be described. This embodiment includes various embodiments described later.

A method for producing an intermediate glass plate according to this embodiment is a method for producing a disk-shaped intermediate glass plate from a glass blank.

Figure 1A:
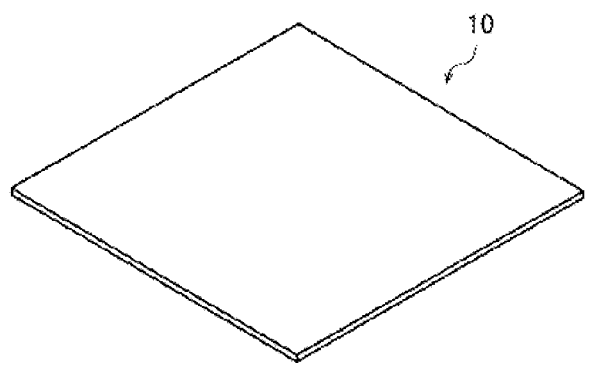
FIGS. 1A and 1B show external perspective views of a glass blank and an intermediate glass plate.
Figure 1B:
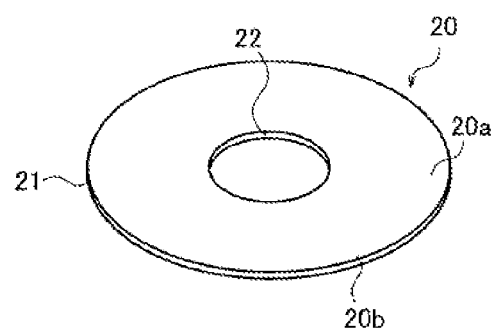

FIG. 1A shows an external perspective view of a glass blank 10. FIG. 1B shows an external perspective view of an intermediate glass plate 20.

The glass blank 10 is a plate-shaped glass plate. Although the outer shape of the glass blank 10 is a rectangular shape in the example shown in FIG. 1A, it may be a circular shape or an elliptical shape, and is not particularly limited. A glass plate produced using a float method, a downdraw method, or a pressing method is used as the glass blank 10, for example. The arithmetic average roughness Ra of a main surface of the glass blank 10 obtained using a float method and a downdraw method is 10 to 20 nm, and the arithmetic average roughness Ra of a main surface of the glass blank 10 obtained using a pressing method is 0.1 to 1.0 μm.

It is possible to use aluminosilicate glass, soda lime glass, borosilicate glass, or the like as the material of glass of the glass blank 10. If a glass substrate for a magnetic disk (magnetic-disk glass substrate) is to be produced using the intermediate glass plate 20 produced by processing the glass blank 10, it is possible to suitably use aluminosilicate glass with which it is possible to obtain a magnetic-disk glass substrate on which chemical strengthening can be performed, and whose main surfaces are highly flat, and that has high substrate strength. Amorphous aluminosilicate glass is more preferably used.

Although there is no limitation on the glass composition of the glass blank 10, according to an embodiment, the glass blank 10 is made of amorphous aluminosilicate glass having a composition containing, in terms of oxide amount in mol %, $SiO_2$ in an amount of 50 mol % to 75 mol %, $Al_2O_3$ in an amount of 1 mol % to 15 mol %, and at least one selected from $Li_2O$, $Na_2O$, and $K_2O$ in a total amount of 5 mol % to 35 mol %, at least one selected from MgO, CaO, SrO, BaO, and ZnO in a total amount of 0 mol % to 20 mol %, and at least one selected from $ZrO_2$, $TiO_2$, $La_2O_3$, $Y_2O_3$, $Ta_2O_5$, $Nb_2O_5$, and $HfO_2$ in a total amount of 0 mol % to 10 mol %.

Also, according to an embodiment, the glass blank 10 is made of amorphous aluminosilicate glass having a composition containing, in mass %, $SiO_2$ in an amount of 57 mass % to 75 mass %, $Al_2O_3$ in an amount of 5 mass % to 20 mass % (note that the total amount of $SiO_2$ and $Al_2O_3$ is 74 mass % or more), $ZrO_2$, $HfO_2$, $Nb_2O_5$, $Ta_2O_5$, $La_2O_3$, $Y_2O_3$, and $TiO_2$ in a total amount of more than 0 mass % and 6 mass % or less, $Li_2O$ in an amount of more than 1 mass % and 9 mass % or less, $Na_2O$ in an amount of 5 mass % to 28 mass % (note that the mass ratio $Li_2O/Na_2O$ is 0.5 or less), $K_2O$ in an amount of 0 mass % to 6 mass %, MgO in an amount of 0 mass % to 4 mass %, CaO in an amount of more than 0 mass % and 5 mass % or less (note that the total amount of MgO and CaO is 5 mass % or less and the CaO content is higher than the MgO content), and SrO+BaO in an amount of 0 mass % to 3 mass %.

Furthermore, according to an embodiment, the glass blank 10 may contain, as essential components, $SiO_2$, $Li_2O$, $Na_2O$, and one or more alkaline earth metal oxides selected from the group consisting of MgO, CaO, SrO, and BaO, the mole ratio of the CaO content relative to the total content of MgO, CaO, SrO, and BaO (CaO/(MgO+CaO+SrO+BaO)) may be 0.20 or less, and the glass transition temperature thereof may be 650° C. or higher. If glass with such a composition is used for a magnetic-disk glass substrate, it is suitable for a magnetic-disk glass substrate that is used as a magnetic disk for energy-assisted magnetic recording.

The glass material of the glass blank 10 is preferably colorless and transparent because such a material has high laser beam transmittance and a defect can be accurately formed at a desired position of the glass blank 10 using a laser beam.

According to an embodiment, the intermediate glass plate 20 is preferably a thin annular glass plate having a circular hole at the central portion thereof. The intermediate glass plate 20 shown in FIG. 1B is provided with an inner hole 20c so as to have a circular inner circumference. The intermediate glass plate 20 includes a pair of main surfaces 20a and 20b, an outer edge surface 21, and an inner edge surface 22. As a result of polishing the main surfaces of the intermediate glass plate 20, for example, the intermediate glass plate 20 can be used as a magnetic-disk glass substrate. A magnetic disk is produced by forming a magnetic layer on the main surfaces 20a and 20b of the intermediate glass plate 20. If the intermediate glass plate 20 is to be used as a magnetic-disk glass substrate, there is no limitation on the size of the magnetic-disk glass substrate, and the magnetic-disk glass substrate has a nominal diameter of 2.5 inches or 3.5 inches, for example. In the case of a magnetic-disk glass substrate with a nominal diameter of 2.5 inches, the outer diameter thereof is 65 mm, the inner diameter of the circular hole is 20 mm, and the thickness thereof is in a range of 0.3 to 1.3 mm, for example. In the case of a magnetic-disk glass substrate with a nominal diameter of 3.5 inches, the outer diameter thereof is 97 mm, the inner diameter of the circular hole is 25 mm, and the thickness thereof is in a range of 0.3 to 0.7 mm, for example.

The method for producing an intermediate glass plate according to this embodiment includes a defect formation step, a separation step, and a polishing step, which will be described later.

Figure 2A:
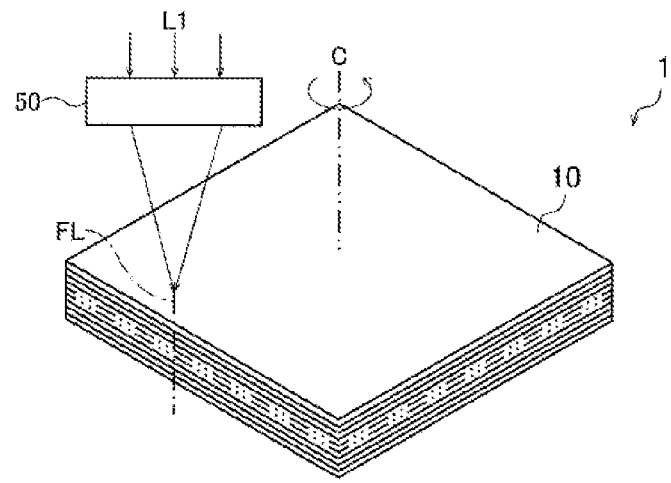
FIGS. 2A and 2B are diagrams illustrating a defect formation step.
Figure 2B:
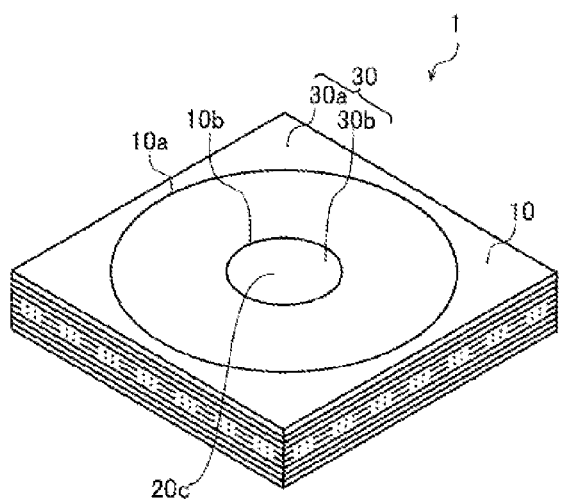

FIGS. 2A and 2B are diagrams illustrating the defect formation step.

In the defect formation step, defects are formed on main surfaces of the laminated glass blanks 10 by irradiating a laminate 1 of the glass blanks 10 with a laser beam L1 along a lamination direction in which the glass blanks 10 are laminated, from one side in the lamination direction, and moving the laser beam L1 relative to the laminate 1 so as to draw a circle in a view from the main surfaces of the glass blanks 10. The laminate 1 is obtained by laminating a plurality of glass blanks 10. There is no particular limitation on the number of laminated glass blanks 10, and the number of laminated glass blanks 10 is 2 to 100, for example. The lamination direction in which the glass blanks 10 are laminated refers to a normal direction of the main surfaces of the glass blanks 10, and an up-down direction in FIG. 2. In the example shown in FIG. 2, the laser beam L1 is emitted downward from above.

Figure 3:
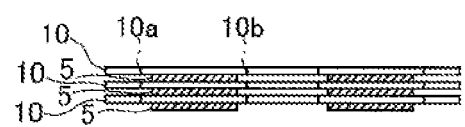
FIG. 3 is a cross-sectional view of a portion of a laminate taken along a lamination direction
Figure 4:
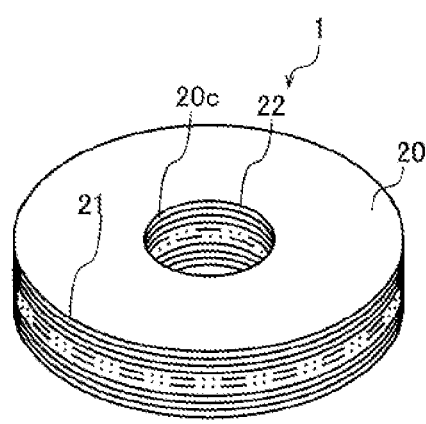
FIG. 4 is a diagram showing a cylindrical laminate.

If the laminated glass blanks 10 are in contact with each other, a main surface thereof may be scratched due to the glass blanks 10 rubbing against each other, for example. Thus, as shown in FIG. 3, the glass blanks are preferably laminated with space holding members 5 such as a temporary adhesive or a spacer interposed therebetween such that the glass blanks 10 are laminated with a space interposed therebetween. FIG. 3 is a cross-sectional view showing a layer of a portion of the laminate 1 taken along the lamination direction. Note that, for facilitating understanding of a description, the glass blanks 10 are laminated without a space interposed therebetween in the laminate 1 shown in FIGS. 2 and 4. Glass blanks and intermediate glass plates that are located in intermediate layers in the lamination direction are not shown in FIGS. 2 and 4.

A temporary adhesive is an adhesive that has a predetermined adhesive strength and can be removed later, and is used for temporarily fixing glass blanks 10 to each other. An adhesive such as an ultraviolet curable resin, a photocurable resin, or a heat softening wax is preferably used as a temporary adhesive, for example. Wax softens and becomes liquid at a predetermined temperature, and becomes solid at room temperature. A water-soluble temporary adhesive can be preferably used in that the laminate 1 can be easily disassembled. Examples of such a temporary adhesive 3 include adhesives that can be cured through irradiation with ultraviolet rays or visible rays and by which the laminate 1 can be disassembled by temporarily fixing glass blanks 10 to each other, irradiating the laminate 1 with ultraviolet rays or visible rays, and immersing the laminate 1 in water, such as acrylate-based adhesives and methacrylate-based adhesives. These types of acrylate-based adhesives or methacrylate-based adhesives are suitable for temporarily fixing glass blanks 10 to each other. Even when a temporary adhesive that has high laser beam transmittance is provided at a position on a main surface of a glass blank 10 that is irradiated with a laser beam, the laser beam can pass through such a temporary adhesive. In this respect, colorless and transparent temporary adhesives are preferably used.

An annular member having a circular hole at the central portion thereof is used as a spacer, for example, and a member made of resin or paper is preferably used because such a member tends not to scratch the main surfaces of the glass blank 10. Examples of the resin include nylon, acrylic resin, aramids, polyethylene, polypropylene, polyurethane, and polyethylene terephthalate. Examples of paper include paper made from pulp fibers, paper made from both pulp fibers and synthetic fibers, and synthetic paper. It is preferable that the outer diameter of a spacer is smaller than the diameter of a circle drawn by a laser beam on a main surface of the glass blank 10 such that the spacer does not block the laser beam that passes through the laminate 1, and the inner diameter of the spacer is larger than the diameter of the inner hole formed in the glass blank 10.

It is preferable that the laminate 1 in which the glass blanks 10 are laminated using spacers is pressed using a lamination jig (not shown) from both sides in the lamination direction such that the positions of the glass blanks 10 do not shift, and is placed on a support base (not shown), for example.

There is no particular limitation on the space between the glass blanks 10 held by the space holding members 5, and the space therebetween is 0.005 to 0.5 mm, for example.

A defect on a main surface of the glass blank 10 that is to be formed in the defect formation step is formed by, specifically, concentrating the laser beam L1 to form a linear focal point (referred to as a focal line hereinafter) FL that passes through the glass blanks 10 in the lamination direction and has a high energy density, and moving the focal line FL relative to the laminate 1. Such a focal line FL can be formed using a conventionally known method. The focal line FL can be formed by concentrating an annular beam formed using a circular-plate-shaped light blocking member disposed on an optical path of the laser beam L1, using a convex lens, for example. Also, the focal line FL can be formed by causing the laser beam L1 to pass through an axicon lens arranged on the optical path such that the traveling direction of the laser beam L1 is the height direction of the cone, for example. This light blocking member and this lens are shown as an optical system 50 in FIG. 2A. A defect, which extends in the plate thickness direction of the glass blanks 10, is formed in each of the glass blanks 10 using such a focal line FL. The defect is, for example, a portion of glass that has been scratched, has melted, deteriorated, or degenerated through irradiation with the laser beam L1.

A solid-state laser such as a YAG laser or Nd:YAG laser is used as a laser source for emitting a laser beam, for example. Therefore, the wavelength of the laser beam is in a range of 1030 nm to 1070 nm, for example.

The laser beam is a pulse laser. In this embodiment, the pulse width of the laser beam is preferably set to $10^{-12}$ seconds or less (1 picosecond or less) from the viewpoint of being able to suppress excessive degeneration of the glass at a position where the focal line FL is formed.

Also, the pulse width of the laser beam and the repetition frequency of the pulse width are adjusted as appropriate such that the energy density at the position where the focal line FL is formed is in a predetermined range. If the energy density is lower than a value in the predetermined range, a defect cannot be formed on the glass blanks 10. Also, light energy of the laser beam L1 can be adjusted as appropriate according to the pulse width and the repetition frequency of the pulse width. Provision of excessive light energy relative to the pulse width and the repetition frequency causes excessive degeneration of glass, leaving residue at the focal position F.

The length of the focal line FL of the laser beam is adjusted by adjusting the optical system 50 as appropriate according to the height of the laminate 1.

An intermediate glass plate 20 whose outer shape has a small roundness and whose edge surface has a small arithmetic average roughness Ra can be obtained by forming the outer shape of the intermediate glass plate 20 along the defect formed using such a focal line FL.

According to an embodiment, it is preferable that, in the defect formation step, the laser beam is moved relative to the laminate 1 by rotating the laminate 1 relative to the laser beam emitted from a fixed position. A defect can be accurately formed in a circular shape through relative movement of the laser beam in this manner, and the laminate 1 whose side wall surface has little level difference, that is, the laminate 1 having a cylindrical shape with a small cylindricity, can be obtained. As shown in FIG. 2A, the laminate 1 can be rotated around a rotation center line C by rotating the support base, for example.

According to an embodiment, it is preferable that, in the defect formation step, as shown in FIG. 2B, defects 10*a* and 10*b* are formed in two circles in order to form circular shapes of the outer circumference and the inner circumference of the intermediate glass plate 20. As a result, the cylindrical laminate 1 whose inner hole 20*c* has a small cylindricity can be obtained. In this case, it is preferable that the laser beam is moved relative to the laminate 1 by rotating the laminate 1 relative to two laser beams emitted from two fixed positions. The intermediate glass plate 20 with little deviation between the central axis of the inner hole 20*c* and the central axis of the cylindrical shape, that is, the intermediate glass plate 20 with a small concentricity, can be obtained by forming the defects 10*a* and 10*b* simultaneously in this manner. The concentricity can be measured by bringing a stylus into contact with each of the inner circumference and the outer circumference of the intermediate glass plate 20 using a three-dimensional measuring device, for example.

A specific example of the method for rotating the laminate 1 relative to two laser beams in this manner is the following method. When the intermediate glass plate 20 whose outer shape has a diameter of 97 mm is to be produced, light sources are disposed so as to emit a laser beam 1 and a laser beam 2 perpendicularly to the main surfaces of the intermediate glass plate 20 at a position P1 located about 12.5 mm away from a rotation center Pc of the laminate 1 and a position P2 located about 48.6 mm away therefrom, and defects (holes or cracks that extend in the plate thickness direction) are formed in each of the intermediate glass plates 20 of the laminate 1 by irradiating the laminate 1 with the laser beams 1 and 2 while rotating the laminate 1. As a result, it is possible to reduce the roundness and the concentricity of the intermediate glass plates 20.

Although the two laser beams 1 and 2 need not be emitted simultaneously in this method, the two laser beams 1 and 2 are preferably emitted simultaneously from the viewpoint of reducing changes in an environment (e.g., temperature, and magnitude of vibration) that affect the laminate 1 and that occur due to irradiation performed with a time lag. It is preferable that conditions (e.g., power, repetition frequency, and the like) regarding two laser beams for forming holes or cracks in the intermediate glass plates 20 at predetermined intervals can be adjusted. It is preferable that, when the separation step is performed through etching, the morphology of the holes or cracks formed on the inner circumferential side and the outer circumferential side of the main surfaces of the intermediate glass plate 20 is adjusted such that movement and separation can be carried out in the intermediate glass plates 20 under similar etching conditions between the holes or cracks formed on the inner circumferential side and the outer circumferential side of the main surfaces of the intermediate glass plates 20.

According to an embodiment, it is preferable that defects are a plurality of holes that are formed at intervals along circles on a main surface of the glass blank 10, for example. Note that the defects 10*a* and 10*b* are indicated by circles in FIG. 2B for facilitating understanding of a description. In this case, the distance between adjacent holes is preferably 0.5 to 30 μm, and more preferably 5 to 20 μm. When the distance between adjacent holes is 5 μm or more, the arithmetic average roughness Ra of an edge surface of the intermediate glass plate 20 can be reduced, and when the distance therebetween is 20 μm or less, the roundness of the intermediate glass plate 20 can be reduced.

Also, the diameter of the holes is preferably 0.05 to 10 μm, and more preferably 0.1 to 5 μm. The smaller the diameter of the holes is, the smaller the roundness of the outer shape of the intermediate glass plate 20 and the arithmetic average roughness Ra of the edge surface thereof are. When the diameter of the holes is 10 μm or more, the edge surface of the intermediate glass plate 20 tends to be further damaged through laser processing. Also, when the diameter of the holes is 10 μm or more, it is difficult to increase the power density of the laser beam to form the holes.

In the separation step, the cylindrical laminate 1 (see FIG. 4) is formed by separating the removal target portion 30 (see FIG. 2B) along the defect while maintaining the laminate 1. The removal target portion 30 is a portion to be removed from the glass blank 10 in the separation step. In the example shown in FIG. 2B, the removal target portion 30 includes an outer portion 30a of the defect 10a and an inner portion 30b of the defect 10b.

According to an embodiment, it is preferable to separate the removal target portion 30 by advancing the defects by applying heat to the laminate 1 when separating the removal target portion 30 from the laminate 1. If the defect is the above-described plurality of holes formed spaced apart from each other, the application of heat causes cracks to extend between adjacent holes starting from the holes and the defect advances. As a result, the removal target portion 30 can be easily separated from the laminate 1 without applying a large force for cutting. At this time, according to an embodiment, a temperature difference is preferably provided between the removal target portion 30 and a portion of the glass blank 10 other than the removal target portion 30. When such a temperature difference is provided, a difference occurs in the amount of expansion or contraction in the in-plane direction of the glass blank 10. As a result, this difference triggers the advance of cracks. Cracks tend to advance by heating and expanding the outer portion 30a of the removal target portion 30, for example. The outer portion 30a can be heated by transferring heat to the outer portion 30a using a high-temperature heat source disposed to surround the laminate 1, such as a heated tubular metal member, for example. Further, cracks also tend to advance by cooling and contracting the inner portion 30b of the removal target portion 30, for example. The inner portion 30b can be cooled using cooling sources disposed on both sides of the laminate 1 in the lamination direction, such as a low-temperature medium (e.g., liquid nitrogen), by successively taking away heat from the glass blanks 10 on both sides in the lamination direction to the glass blank 10 at the center in the lamination direction. It is preferable that the temperature difference between the removal target portion 30 and a portion of the glass blank 10 other than the removal target portion 30 is in a range of 150° C. to 250° C. in order to trigger the advance of cracks.

The above-described heat sources are also preferably disposed at intervals at a plurality of positions around the laminate 1, for example. If the glass blank 10 has a rectangular shape, for example, it is also preferable to dispose heat sources at positions where the heat sources face the center portions of the four sides thereof that have little removal allowance. Because a temperature distribution is formed on the circumference of the outer portion 30a by disposing the heat sources in this manner and the outer portion 30a tends to crack, cutting can be more easily performed.

Also, according to another embodiment, it is preferable to separate the removal target portion 30 by advancing the defect by supplying an etchant to the laminate 1 when separating the removal target portion 30 from the laminate 1. If the defect is the above-described plurality of holes formed spaced apart from each other, when the etchant is supplied, a portion of glass that surrounds the holes will be corroded by the etchant that has entered the holes, and cracks extend between adjacent holes starting from the holes and the defect advances. As a result, the removal target portion 30 can be easily separated from the laminate 1 without applying a large force for cutting. At this time, according to an embodiment, the etchant is preferably supplied to the main surfaces of the glass blank 10 located in the uppermost layer of the laminate 1. The supplied etchant moves downward in the defect while corroding the portion of glass that surrounds the holes and reaches the lower surface of a glass blank 10, and further moves downward from the lower surface of the glass blank 10 to a main surface of a glass blank 10 located on the lower layer side thereof. Defects are formed at positions in the same in-plane direction of adjacent glass blanks 10 by irradiating the laminated glass blanks 10 with laser beams in the lamination direction as described above. Thus, the etchant that has moved downward from the lower surface of the glass blank 10 tends to enter the defects on the main surface of the glass blank 10 located on the lower layer side thereof. Repetition of such a movement of the etchant in the lamination direction can efficiently advance the defects. In this case, it is preferable that a masking member made of a resist material is provided in a region of an upper main surface of the glass blank 10 in the uppermost layer of the laminate 1 other than the circles along which the defects are formed, for example. Separation using such an etchant is preferable because the outer circumference of the intermediate glass plate 20 where minute unevenness is formed due to the plurality of holes formed at intervals can be smoothened.

Separation of the removal target portion 30 using the etchant is not limited to supplying the etchant to the glass blank 10 in the uppermost layer of the laminate 1 as described above, and the etchant can be supplied to the laminate 1 from both sides in the direction of the rotation center line C of the laminate 1 by spraying the etchant, for example. Also, the etchant can be supplied to the laminate 1 by immersing the laminate 1 in the etchant, for example. By using these methods as well, the etchant enters a plurality of holes or cracks formed in the glass blanks 10, and thus the defects can be advanced and the removal target portion 30 can be separated.

An aqueous solution of a mixed acid that contains hydrofluoric acid and at least one type of sulfuric acid, nitric acid, hydrochloric acid, and hydrofluorosilicic acid is used as an etchant. The concentration of hydrofluoric acid in the etchant is in a range of 5 to 20 mass %, for example.

It is also preferable to supplementally damage the removal target portion 30 in the separation step during cutting.

In the separation step, portions of the glass blanks 10 other than the removal target portion 30 are preferably pressed using a lamination jig from both sides in the lamination direction such that the laminate 1 does not come apart when separating the removal target portion 30.

As described above, the cylindrical laminate 1 (see FIG. 4) is formed. This laminate 1 has a plurality of disk-shaped intermediate glass plates 20. That is, the disk-shaped intermediate glass plates 20 can be obtained by performing the separation step.

In the polishing step, in order to obtain disk-shaped intermediate glass plates 20 that have been subjected to edge surface polishing, the side wall surface of the laminate 1 is polished while maintaining the cylindrical laminate 1. Here, if the laminate 1 is to be disassembled and edge surface polishing is performed on the intermediate glass plates 20, even when the intermediate glass plate 20 has small roundness and there is little roundness variation between intermediate glass plates 20, the concentricity may vary between intermediate glass plates 20 as described above. In this embodiment, variation in the concentricity between intermediate glass plates 20 can be suppressed by polishing the side wall surface while maintaining the laminate 1.

Edge surface polishing is performed by moving a polishing brush and the laminate 1 relative to each other while supplying a polishing liquid containing loose abrasive particles between the polishing brush and the side wall surface of the laminate 1, for example. The side wall surface of the laminate 1 is mirror-finished through edge surface polishing.

By performing edge surface polishing, it is possible to remove contamination such as foreign matter particles (e.g., dust) adhering to an edge surface of an intermediate glass plate 20, damage, or impairments such as scratches. According to a magnetic disk produced using, as a glass substrate, the intermediate glass plate 20 that has been subjected to edge surface polishing in this manner, it is possible to prevent the occurrence of thermal asperities. Microparticles such as ceria particles or zirconia particles are used as loose abrasive particles in the polishing liquid, for example. The size of the loose abrasive particles is 0.5 to 3 μm in terms of an average particle size (D50), for example. A channel roll brush, which is formed by helically wrapping a channel brush around an axis core that extends linearly at a predetermined interval at a predetermined lead angle and fixing the channel brush, is used as a polishing brush, for example.

Before edge surface polishing is performed using a polishing brush or the like in this manner, an outer circumferential side surface of a cylindrical rotating grindstone may be brought into contact with the side wall surface on the outer circumferential side or the inner circumferential side of the laminate 1 and perform grinding or polishing as needed. With this method, there are cases where the processing speed is higher than in edge surface polishing using a polishing brush or the like, and the productivity of the intermediate glass plates 20 is improved. Edge surface polishing using a polishing brush or the like may be omitted by performing such edge surface polishing and then etching the edge surface using an etchant, or by heating and mirror-finishing the outer and inner circumferential edge surfaces through irradiation with laser beams, for example.

In the polishing step, the side wall surfaces (outer side wall surface and inner side wall surface) of the laminate 1 that correspond to the outer circumference and the inner circumference thereof are preferably polished. While the polishing step is performed, the intermediate glass plates 20 are preferably pressed using a lamination jig from both sides in the lamination direction such that the laminate 1 does not come apart.

Figure 5:
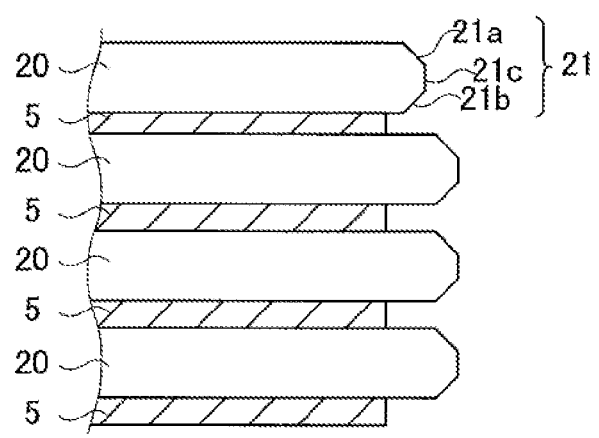
FIG. 5 is a cross-sectional view of an edge surface of an intermediate glass plate subjected to edge surface polishing.

According to an embodiment, in the polishing step, polishing is preferably performed so as to form a chamfered surface on each edge surface of the intermediate glass plates 20. Because the intermediate glass plates 20 each have edge surfaces that are orthogonal to the main surfaces thereof because the intermediate glass plates 20 are processed using laser beams emitted in the lamination direction, an edge portion of an intermediate glass plate 20 is likely to be chipped, for example. Careful handling of the intermediate glass plates 20 in order to prevent impairments at such an edge portion is not preferable in view of production efficiency. According to this embodiment, an intermediate glass plate 20 that has favorable handleability can be obtained by forming a chamfered surface on the edge surface of the intermediate glass plate 20. FIG. 5 is a cross-sectional view showing a layer of a portion of the laminate 1 that has been subjected to edge surface polishing, taken along the lamination direction. In the intermediate glass plate 20 shown in FIG. 5, the outer edge surface 21 includes a side wall surface 21c that is orthogonal to the main surfaces 20a and 20b, and chamfered surfaces 21a and 21b that connect the side wall surface 21c to the main surfaces 20a and 20b. In the polishing step, such chamfered surfaces 21a and 21b are formed simultaneously with edge surface polishing. When the chamfered surfaces 21a and 21b are to be subjected to edge surface polishing using the above-described channel roll brush, for example, the material and the thickness of the bristles of the brush, the length by which the bristles enter the gaps between intermediate glass plates 20, the moving speed of the brush in the lamination direction, the amount of the etchant supplied between the brush and the side wall surface of the laminate 1, and the like can be adjusted.

Also, the chamfered surfaces 21a and 21b can be formed by etching the edge surfaces using the etchant, for example. Examples of such a method include a method by which the cylindrical laminate 1, which has been produced from the laminate 1 of the glass blanks 10 in which an adhesive layer is provided on all of the main surfaces of adjacent glass blanks 10, is etched. A heat softening wax, a water-soluble photo-curable resin, or an ultraviolet curable resin is used as an adhesive for forming the adhesive layer, for example. Etching can be performed by immersing and shaking the laminate 1 in the etchant, or showering or spraying the etchant onto the laminate 1 using a shower device while rotating the laminate 1 around the central axis of the rotation and/or revolving around a predetermined axis, for example.

It is preferable that the chamfer width for the chamfered surfaces 21a and 21b is in a range of 50 to 150 μm.

According to an embodiment, it is preferable to disassemble the laminate 1 after the polishing step is performed so as to retrieve the intermediate glass plates 20. When the laminate 1 has been produced using a temporary adhesive, the laminate 1 can be easily disassembled by immersing the laminate 1 in warm water at a temperature of 60° C. to 90° C. so as to elute the temporary adhesive into the water, for example. Also, when the laminate 1 has been produced using spacers, the laminate 1 is disassembled by alternately taking intermediate glass plates 20 and spacers out from the laminate 1 in order starting from the intermediate glass plate 20 in the uppermost layer.

With the above method, the cylindrical laminate 1 is produced by forming defects by irradiating the laminate 1 of the glass blanks 10 with laser beams in the lamination direction, and separating removal target portions along the defects. Thus, it is possible to obtain the laminate 1 with little level difference on the side wall surface thereof, that is, the laminate 1 with an extremely small cylindricity. Because the laminate 1 with little level difference on the side wall surface thereof has a small polishing machining allowance in this manner, the intermediate glass plates 20 can be efficiently produced. Also, because the laminate 1 has a small polishing machining allowance, the roundness of the intermediate glass plates 20 is kept small, and there is also a small roundness variation between intermediate glass plates 20. Further, because edge surface polishing is performed while maintaining the laminate 1, as in a case where the glass blanks 10 are processed using laser beams one by one and laminated, there is no need to increase the machining allowance to eliminate a level difference on the side wall surface, and production efficiency is high, for example. That is, according to the method for producing an intermediate glass plate 20 in this embodiment, when disk-shaped intermediate glass plates 20 are produced from the glass blanks 10, the outer shapes of the intermediate glass plates 20 have small roundness values, and variation in the roundness of the outer shapes between intermediate glass plates 20 is also reduced. Therefore, the intermediate glass plates 20 can be efficiently produced.

Next, the laminate 1 according to this embodiment will be described. This embodiment includes various embodiments described later.

The laminate 1 is obtained by laminating the circular intermediate glass plates 20. The outer shape of the laminate 1 is a cylindrical shape. The cylindricity of the outer side wall surface of the cylindrical shape (JIS B0621-1984) of the laminate 1 is 7 μm or less, and the arithmetic average roughness Ra (JIS B0601: 2001) of the outer side wall surface is 0.5 μm or less. Such a laminate 1 can be produced by performing the above-described defect formation step and separation step. Such a laminate 1 has a smaller cylindricity than a laminate obtained by processing the glass blanks 10 using laser beams one by one and laminating the glass blanks 10. As described above, in the defect formation step, laser beams are emitted to the laminate 1 in the lamination direction. Therefore, there is no deviation in the positions where the defects are formed between glass blanks 10, or even if there is deviation, the amount of the deviation is very small. Thus, the side wall surface of the cylindrical laminate 1 obtained by performing the separation step has little level difference, and the cylindricity of the outer side wall surface is 7 μm or less, and preferably 3 μm or less. The cylindricity is measured using a roundness measurement device. Also, because the outer side wall surface of the laminate 1 has a processed surface that has been processed using laser beams, the outer side wall surface has a small arithmetic average roughness Ra of 0.5 μm or less. The laminate 1 whose outer side wall surface has a small cylindricity and a small arithmetic average roughness Ra in this manner has a small amount of machining allowance in the polishing step, thus shortening the time taken for edge surface polishing. Thus, the intermediate glass plates can be efficiently produced. Also, because the laminate 1 has a small polishing machining allowance, the roundness of the intermediate glass plates is kept small, and there is also a small roundness variation between intermediate glass plates. That is, according to the laminate 1 of this embodiment, it is possible to efficiently produce intermediate glass plates whose outer shape has a small roundness value and has a small roundness variation between intermediate glass plates.

According to an embodiment, the laminate 1 is provided with an inner hole 20c around the central axis of the cylindrical shape thereof. In this case, the cylindricity of the inner hole 20c is preferably 7 μm or less, and deviation between the central axis of the inner hole 20c and the central axis of the cylindrical shape, that is, the concentricity, is preferably 3 μm or less. Such a laminate 1 can be produced by performing the above-described defect formation step and separation step. In such a laminate 1, because the inner hole is provided along the defects formed in circles using a laser beam, the cylindricity of the inner hole 20c is as small as the cylindricity of the outer side wall surface and is in the above range. Also, because the outer side wall surface and the inner side wall surface are provided along the defects formed in two circles using laser beams, the concentricity thereof is small and is in the above range. The laminate 1 whose inner hole 20c has a small cylindricity also has a small amount of machining allowance in the polishing step, and it is possible to shorten the time taken for performing edge surface polishing. Thus, according to the laminate 1 of this embodiment, it is possible to further efficiently produce the intermediate glass plates with small concentricity.

Also, according to an embodiment, the cylindricity of the outer side wall surface is preferably 3 μm or less, and the outer side wall surface preferably has an arithmetic average roughness Ra of 0.02 μm or less. Such a laminate 1 can be produced by performing the above-described polishing step in addition to the above-described defect formation step and separation step. That is, the laminate 1 of this embodiment has an outer side wall surface that has been subjected to edge surface polishing. When such a laminate 1 is disassembled, it is possible to obtain intermediate glass plates whose outer shapes have a small roundness and have a small roundness variation between intermediate glass plates.

Note that, because the defects of the glass blanks 10 are formed in circles using laser beams, the intermediate glass plates 20 formed along the defects have small roundness. According to an embodiment, the roundness (JIS B0621-1984) of an edge surface of the intermediate glass plate 20 is 10 μm or less, and preferably 3 μm or less before edge surface polishing is performed, and 3 μm or less, and preferably 2 μm or less after edge surface polishing is performed. The roundness is measured using a roundness measurement device. Also, because the laminate 1 of this embodiment has a small polishing machining allowance, the roundness of the intermediate glass plates 20 is also kept small after edge surface polishing, and there is also a small roundness variation between intermediate glass plates 20.

According to an embodiment, it is preferable that a chamfered surface is not provided on the inner edge surface 22 of an intermediate glass plate 20 that corresponds to the inner side wall surface of the laminate 1 that extends along the inner hole 20c, or even when a chamfered surface is provided, the chamfer width along the main surfaces 20a and 20b of the intermediate glass plate 20 is 150 μm or less. Because the above-described polishing step is performed while maintaining the cylindrical laminate 1, a shaft need not be inserted into the inner hole 20c when the outer side wall surface is subjected to edge surface polishing, and a chamfered surface for facilitating insertion of the shaft need not be provided on the inner side wall surface, or a chamfered surface with a large chamfer width need not be provided. Because no chamfered surface is provided on the inner edge surface 22 of the intermediate glass plate 20 or the chamfer width for the chamfered surface is set to 150 μm or less in this manner, it is possible to shorten the time taken for edge surface polishing and efficiently produce the intermediate glass plates 20. On the other hand, the chamfer width of the chamfered surface on the inner edge surface 22 of the intermediate glass plate 20 along the main surfaces 20a and 20b is preferably 50 μm or more. Note that the inner edge surface 22 of the intermediate glass plate 20 may also be provided with a chamfered surface with a chamfer width according to user requirements, for example.

According to an embodiment, the volume of the removal target portion 30 is preferably 35% or less of the total volume of the laminated glass blanks 10 so as not to waste the glass blanks 10, and if the outer shape of the glass blanks 10 is rectangular, the volume of the removal target portion 30 is preferably less than 35% thereof. Because the intermediate glass plates 20 having a large size can be cut out from the laminate 1 having the removal target portion 30 having a small volume, the glass blanks 10 can be effectively used. Also, because the removal target portion 30 has a small volume in this manner, the laminate 1 can be easily rotated with respect to the laser beams in the defect formation step. Such a laminate 1 in which the removal target portion 30 has a small volume can be obtained by cutting out rectangular glass blanks 10 by cutting a glass plate that is large enough to cut out a plurality of intermediate glass plates 20 in a grid pattern, and laminating the rectangular glass blanks 10, for example. If an intermediate glass plate 20, which is used for a magnetic-disk glass substrate having a nominal diameter of 3.5 inches, is to be produced, the glass blanks 10 are cut in a rectangular shape having four sides with a length of 100 to 110 mm, for example. On the other hand, from the viewpoint of ensuring handleability when processing the glass blanks 10 using laser beams, the lower limit of the volume of the removal target portion 30 is preferably 10% or more of the total volume of the laminated glass blanks 10, and if the outer shape of the glass blanks 10 is rectangular, the lower limit thereof is preferably 28% or more the total volume thereof. Note that the outer shape of the glass blanks 10 may be a substantially circular shape produced using a pressing method, for example. The substantially circular glass blanks 10 have a diameter of 100 to 108 mm, for example.

Next, a method for producing a glass plate for a magnetic disk according to this embodiment will be described. This embodiment includes various embodiments described later.

The method for producing a glass plate for a magnetic disk according to this embodiment includes a step of producing an intermediate glass plate, and a step of producing a glass plate for a magnetic disk.

In the step of producing an intermediate glass plate, the intermediate glass plate is produced using the above-mentioned method for producing an intermediate glass plate according to the above embodiment.

In the step of producing a glass plate for a magnetic disk, a magnetic-disk glass plate is produced by polishing main surfaces of the intermediate glass plates that are separated from a laminate. Polishing of the main surfaces includes first polishing and second polishing, which will be described below. Note that, before polishing, the main surfaces of the intermediate glass plates may be ground using a sheet member (diamond sheet) in which diamond abrasive particles are held using resin or metal, for example.

In the first polishing, the main surfaces on both sides of an intermediate glass plate are polished while the outer edge surface of the intermediate glass plate is held in a holding hole provided in a polishing carrier of a known double-side polishing apparatus. The first polishing is performed in order to adjust minute surface unevenness (microwaviness, roughness).

In first polishing processing, the main surfaces of the intermediate glass plate are polished using a double-side polishing apparatus provided with a planetary gear mechanism. Specifically, the main surfaces on both sides of an intermediate glass plate are polished while the outer edge surface of the intermediate glass plate is held in a holding hole provided in a holding member of the double-side polishing apparatus. The double-side polishing apparatus has a pair of upper and lower surface plates (upper surface plate and lower surface plate), and tabular polishing pads (resin polishers, for example) having an overall annular shape are attached to the upper surface of the lower surface plate and the bottom surface of the upper surface plate. The intermediate glass plate is held between the upper surface plate and the lower surface plate. Then, the intermediate glass plate and the surface plates are moved relative to each other by moving one or both of the upper surface plate and the lower surface plate while supplying a polishing slurry containing loose abrasive particles, and thus the two main surfaces of the intermediate glass plate can be polished. Ceria abrasive particles, zirconia abrasive particles, or the like are used as loose abrasive particles used in the first polishing, for example. The size of the polishing abrasive particles is in a range of 0.5 to 3 μm in terms of an average particle size (D50).

The intermediate glass plate may be chemically strengthened after the first polishing. In this case, a melt in which potassium nitrate and sodium sulfate are mixed, for example, can be used as the chemical strengthening liquid, and the intermediate glass plate is immersed in the chemical strengthening liquid. Accordingly, it is possible to form a compressive stress layer on the surface of the intermediate glass plate through ion exchange.

Then, the second polishing is performed on the intermediate glass plate. The second polishing processing is performed in order to mirror-polish the main surfaces. A double-side polishing apparatus having a configuration that is similar to that of the double-side polishing apparatus used in the first polishing is used in the second polishing as well. Specifically, the main surfaces on both sides of the intermediate glass plate are polished while the outer edge surface of the intermediate glass plate is held in a holding hole provided in a polishing carrier of the double-side polishing apparatus. The second polishing processing differs from the first polishing processing in that the type and particle size of loose abrasive particles are different, and the hardness of the resin polishers is also different. It is preferable that the hardness of the resin polisher is lower than that in the first polishing processing. A polishing liquid containing colloidal silica as loose abrasive particles is supplied between the polishing pads of the double-side polishing apparatus and the main surfaces of the intermediate glass plate, and the main surfaces of the intermediate glass plate are polished, for example. The size of the polishing abrasive particles used in the second polishing is preferably in a range of 5 to 50 nm in terms of an average particle diameter (D50).

Whether or not chemical strengthening processing is to be carried out need only be selected as appropriate in consideration of the composition of the glass and how necessary chemical strengthening processing may be therefor in this embodiment. Other polishing processing may also be performed in addition to the first polishing processing and the second polishing processing, or processing for polishing two main surfaces may be completed through a single polishing process.

As a result of polishing the main surfaces of the intermediate glass plate in this manner, it is possible to obtain a glass substrate, which will be a final product that satisfies the conditions required for a glass substrate for a magnetic disk and the like.

Note that the intermediate glass plates may be ground before the first polishing is performed.

According to the above method, a glass substrate for a magnetic disk is produced using the intermediate glass plate 20 whose outer shape has a small roundness value and whose outer edge surface has a small arithmetic average roughness Ra. Thus, the outer shape of the obtained glass substrate for a magnetic disk also has a small roundness value, and the outer edge surface thereof also has a small arithmetic average roughness Ra. According to a magnetic disk produced using such a glass substrate for a magnetic disk, it is possible to prevent the occurrence of thermal asperities. Also, as described above, there is a small variation in the roundness of the outer shapes between intermediate glass plates 20. Therefore, the glass substrates for a magnetic disk produced using the intermediate glass plate 20 included in the laminate 1 also have a small variation in roundness between substrates. That is, it is possible to produce glass substrates for a magnetic disk whose outer shapes have uniform roundness.

As described above, although a method for producing an intermediate glass plate, a method for producing a glass plate for a magnetic disk, and an intermediate glass plate laminate according to the present invention have been described in detail, the present invention is not limited to the embodiment, and it will be appreciated that various improvements and modifications can be made without departing from the gist of the present invention.

The invention claimed is:

1. A laminate comprising:
    a plurality of circular glass plates; and
    space holding members each of which is disposed between adjacent circular glass plates among the plurality of circular glass plates, such that the plurality of circular glass plates are laminated with a space interposed between the adjacent circular glass plates, wherein
    the laminate has a cylindrical shape,
    a cylindricity of an outer side wall surface of the cylindrical shape of the laminate is 7 μm or less, and
    a plurality of defects that extend in a plate thickness direction are formed at positions on an edge surface of each of the plurality of circular glass plates, such that the positions are same among the plurality of circular glass plates as viewed the plate thickness direction.

2. The laminate according to claim 1, wherein the plurality of defects are formed on the edge surface at an interval.

3. The laminate according to claim 2, wherein the interval is 0.5 to 30 μm.

4. The laminate according to claim 1, wherein the laminate has an inner hole, and a cylindricity of an inner side wall surface defined by the inner hole is 7 μm or less.

5. The laminate according to claim 4, wherein a deviation between a central axis of the inner hole and a central axis of the cylindrical shape is 3 μm or less.

6. A method for producing the laminate according to claim 1, the method comprising:
    forming a plurality of defects on main surfaces of a plurality of laminated glass blanks which are obtained by laminating glass blanks such that each of the space holding members is disposed between adjacent glass blanks among the glass blanks, by irradiating the laminated glass blanks, with a laser beam from one side in a lamination direction in which the glass blanks are laminated, along the lamination direction, and by moving the laser beam relative to the laminated glass blanks such that a circle is drawn in a view from the main surfaces of the glass blanks; and
    separating a removal target portion along the defects while maintaining the laminating of the glass blanks to obtain the laminate.

7. The method for producing the laminate according to claim 6,
    wherein the outer side wall surface of the cylindrical shape of the laminate has an arithmetic average roughness Ra of 0.5 μm or less.

8. The method for producing the laminate according to claim 6,
    wherein the volume of the removal target portion is 35% or less of the total volume of the laminated glass blanks.

9. The method for producing the laminate according to claim 6,
    wherein, when the removal target portion is separated from the laminated glass blanks, the removal target portion is separated by advancing the defects by supplying an etchant to the laminated glass blanks.

10. The method for producing the laminate according to claim 6,
    wherein, when the removal target portion is separated from the laminated glass blanks, the removal target portion is separated by advancing the defects by applying heat to the laminated glass blanks.

11. A method for producing a disk-shaped glass plate from a glass blank, the method comprising:
    the method for producing the laminate according to claim 6; and
    polishing the outer side wall surface of the laminate so as to obtain a disk-shaped glass plate that has been subjected to edge surface polishing.

12. The method for producing a glass plate according to claim 6,
    wherein, in the polishing the outer side wall surface, the polishing is performed so as to form a chamfered surface on each edge surface of the circular glass plate.

13. The method for producing a glass plate according to claim 11,
    wherein the glass plate is provided with an inner hole so as to have a circular inner circumference,
    in the forming of the defects, the defects are formed in two circles in order to form a circular shape of an outer circumference and a circular shape of the inner circumference,
    in the separating of the removal target portion, an outer portion of a larger circle of the two circles and an inner portion of a smaller circle of the two circles are removed from the laminated glass blanks as the removal target portions, and
    in the polishing of the side wall surface of the laminate, side wall surfaces of the laminate that respectively correspond to the outer circumference and the inner circumference are polished.

14. The method for producing a glass plate according to claim 11, further comprising
    polishing main surfaces of the glass plate that is separated from the laminate after the side wall surface is polished.

* * * * *